(12) United States Patent
Habot

(10) Patent No.: US 6,415,338 B1
(45) Date of Patent: Jul. 2, 2002

(54) SYSTEM FOR WRITING A DATA VALUE AT A STARTING ADDRESS TO A NUMBER OF CONSECUTIVE LOCATIONS EQUAL TO A SEGMENT LENGTH IDENTIFIER

(75) Inventor: Ronen Habot, Ocean, NJ (US)

(73) Assignee: Globespan, Inc., Red Bank, NJ (US)

( * ) Notice: Subject to any disclaimer, the term of this patent is extended or adjusted under 35 U.S.C. 154(b) by 0 days.

(21) Appl. No.: 09/247,366

(22) Filed: Feb. 10, 1999

Related U.S. Application Data

(60) Provisional application No. 60/074,412, filed on Feb. 11, 1998.

(51) Int. Cl.$^7$ .............................................. G06F 13/14
(52) U.S. Cl. .............................. 710/22; 710/5; 710/25; 710/26; 711/171
(58) Field of Search ............................... 710/5, 22, 25, 710/26; 711/171

(56) References Cited

U.S. PATENT DOCUMENTS

| | | | | |
|---|---|---|---|---|
| 4,507,781 A | * | 3/1985 | Alvarez, III et al. | 370/266 |
| 4,692,859 A | * | 9/1987 | Ott | 364/200 |
| 4,847,750 A | * | 7/1989 | Daniel | 364/200 |
| 5,001,624 A | * | 3/1991 | Hoffman et al. | 364/200 |
| 5,212,795 A | * | 5/1993 | Hendry | 395/725 |
| 5,659,798 A | * | 8/1997 | Blumrich et al. | 395/846 |
| 5,721,949 A | * | 2/1998 | Smith et al. | 395/825 |
| 5,732,011 A | * | 3/1998 | Schmidt | 365/73 |
| 5,822,616 A | * | 10/1998 | Hirooka | 395/842 |
| 5,826,106 A | * | 10/1998 | Pang | 395/845 |
| 5,926,646 A | * | 7/1999 | Pickett et al. | 712/32 |
| 5,974,516 A | * | 10/1999 | Qureshi | 711/171 |

\* cited by examiner

*Primary Examiner*—Thomas Lee
*Assistant Examiner*—Abdelmoniem Elamin
(74) *Attorney, Agent, or Firm*—Thomas, Kayden, Horstemeyer & Risley

(57) ABSTRACT

The present invention is directed to an improved direct memory access (DMA) controller for executing commands having an improved instruction set. In accordance with one aspect of the present invention, a DMA controller is provided having an enhance command set. Specifically, a DMA controller is provided having the ability to perform a memory fill command. Thus, in accordance with one aspect of the invention, a method is provided for controlling a DMA controller to execute a memory fill command, wherein the method obtains a starting address, a segment length identifier, and a data value. Preferably, this information is obtained by reading successive bytes from external memory. The method then writes the data value to a plurality of consecutive locations in the memory, beginning at the starting address, wherein the number of consecutive locations written to is equal to the segment length identifier. In accordance with another aspect of the invention, a method is provided for controlling a DMA controller to execute a memory fill command, wherein the method obtains a starting address, an ending address, and a data value. As described above, this information is preferably obtained by reading successive bytes from external memory. The method then writes the data value to a plurality of consecutive locations in the memory, beginning at the starting address and ending at the ending address.

15 Claims, 9 Drawing Sheets

SYSTEM FOR WRITING A DATA VALUE AT A STARTING ADDRESS TO A NUMBER OF CONSECUTIVE LOCATIONS EQUAL TO A SEGMENT LENGTH IDENTIFIER

CROSS-REFERENCE TO RELATED APPLICATIONS

The present application claims the benefit of U.S. Provisional Patent Application Serial No. 60/074,412, filed Feb. 11, 1998, which is hereby incorporated by reference in its entirety.

TECHNICAL FIELD

The present invention generally relates to computer systems, and more particularly to a direct memory access (DMA) controller.

BACKGROUND OF THE INVENTION

As is well known, DMA transfers involve the movement or transfer of data from one memory device to another memory device (within a computing system) across a system bus, and without intervening communication through a processor.

More particularly, a processor such as a CPU typically controls and coordinates the execution of instructions within computing system. Ancillary to this operation, the CPU must frequently move data from a memory or other peripheral device into the CPU for processing, or out of the CPU to a memory or other peripheral device after processing. The CPU also often coordinates the movement of data from one memory or peripheral device to another memory or peripheral device.

In very early computing systems, this latter movement of data was accomplished by first reading the data directly from one memory device into the processor, then immediately writing that same data out to another memory device. As computing systems advanced, DMA controllers were created to facilitate such data transfers by controlling the movement of data directly from one memory device to another memory device. FIG. 1 shows a block diagram illustrating certain fundamental components of a computer system that are utilized in connection with such a conventional DMA transfer. In this regard, a single DMA controller 10 is illustrated in connection with a source memory 12, a destination memory 14 and a CPU or some other processing circuit 16. Each of the devices is illustrated as being interconnected, or otherwise disposed for intercommunication, via a bus 18, which preferably comprises both address and data lines. The devices are also interconnected through various control and other signaling lines 19, 20, 21, and 22. In operation, data 24 may be directly transferred between memory devices 12 and 14 across the bus 18, without having to transition through the CPU 16, which allows data to be transferred between the memories at a much higher rate.

As is known, there are three primary steps involved in a DMA transfer. First, the processor 16 sets up the DMA transfer by supplying a DMA controller 10 with the identity of the source and destination memories 12 and 14, the address of the first bit to byte to be transferred from the source memory 12, as well as the number of bytes to be transferred. Once the CPU 16 has communicated this information to the DMA controller 10, the DMA controller 10 starts the operation by either taking control of the bus 18, or otherwise requesting shared control of the bus with other devices (not shown). In this regard, other devices that are disposed along the same bus 18 may share the bus, the allocation of which may be controlled by an arbitration circuit (not shown), as is understood by those skilled in the art. Once the DMA controller 10 has the bus 18, it initiates the bus transfer (assuming that the data is available for transfer). In this regard, and as will be understood by persons skilled in the art, if the data were temporarily stored within a cache memory, or some other device (not shown), then the data actually stored in the memory device 12, would be considered "dirty data", and therefore not subject to transfer. Resolution of nuances such as this are known by those skilled in the art, and need not be discussed herein, in order to effectively illustrate the basic DMA operations as are known by prior art systems, Utilizing control lines 21 and 22, the DMA controller 10 may orchestrate the transfer of data from the source memory 12 to the destination memory 14. The DMA controller 10 may control the address supplied on address bus 18, as well as the chip select and enable lines necessary in order to read data from a select memory address of the source memory 12 and write that same data to a select memory address in the destination memory 14. Assuming that a plurality of data bytes are to be transferred from the source memory 12 to the destination memory 14, then the DMA control 10 will update the addresses on bus 18 accordingly. Once the DMA transfer is complete, the DMA controller 10 may interrupt the CPU 16 to inform it accordingly. It will be appreciated that throughout the duration of the DMA transfer, the CPU 16 may be performing various processing operations. As is known, this greatly enhances the overall efficiency of the system by allowing the CPU 16 to perform processing tasks, without having to get bogged down in managing simple data transfers between memory devices.

Notwithstanding the various advantages and efficiency gains achieved by DMA devices, there is a constant desire to improve on performance. One manner in which performance improvements have been obtained is through the use of DMA controllers that include the ability to execute commands. In such devices, as the DMA controller operates, it may program itself with a self-executing command and start a DMA cycle according to the command.

It has been found, however, that the instruction sets of DMA controllers known in the prior art are relatively constrained. There is, therefore, a need for a DMA controller that provides an enhanced instructions set.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is directed to an improved direct memory access (DMA) controller for executing commands having an improved instruction set. In accordance with one aspect of the present invention, a DMA controller is provided having an enhance command set. Specifically, a DMA controller is provided having the ability to perform a memory fill command.

Thus, in accordance with one aspect of the invention, a method is provided for controlling a DMA controller to execute a memory fill command, wherein the method obtains a starting address, a segment length identifier, and a data value. Preferably, this information is obtained by reading successive bytes from external memory. The method then writes the data value to a plurality of consecutive locations in the memory, beginning at the starting address, wherein the number of consecutive locations written to is equal to the segment length identifier.

In accordance with another aspect of the invention, a method is provided for controlling a DMA controller to execute a memory fill command, wherein the method obtains a starting address, an ending address, and a data value. As described above, this information is preferably obtained by reading successive bytes from external memory. The method then writes the data value to a plurality of consecutive locations in the memory, beginning at the starting address and ending at the ending address.

Other features and advantages of the present invention will become apparent to one with skill in the art upon examination of the following drawings and detailed description. It is intended that all such additional features and advantages be included herein within the scope of the present invention, as is defined in the claims.

BRIEF DESCRIPTION OF THE SEVERAL VIEWS OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
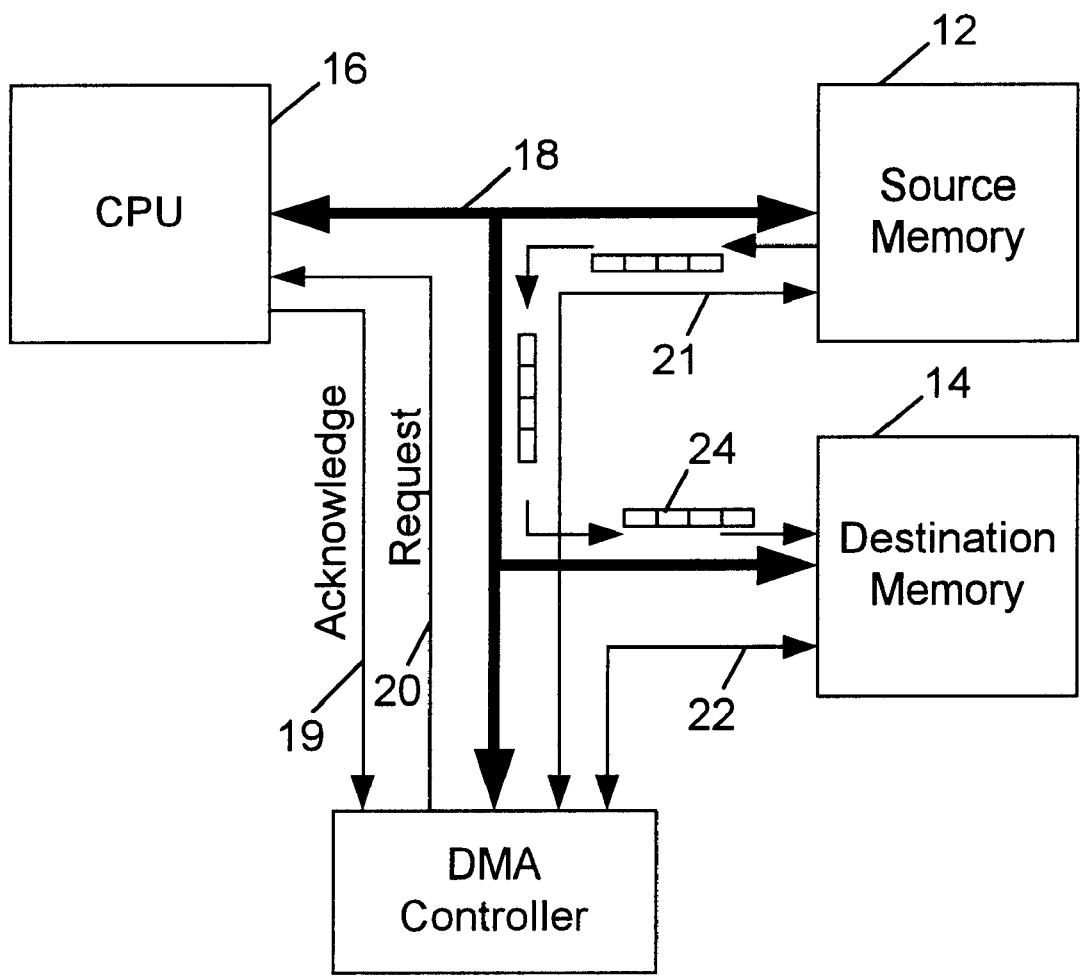
FIG. 1 is a block diagram of a DMA controller in communication with memory and a CPU via a bus, as is known in the prior art.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims0.

Figure 2:
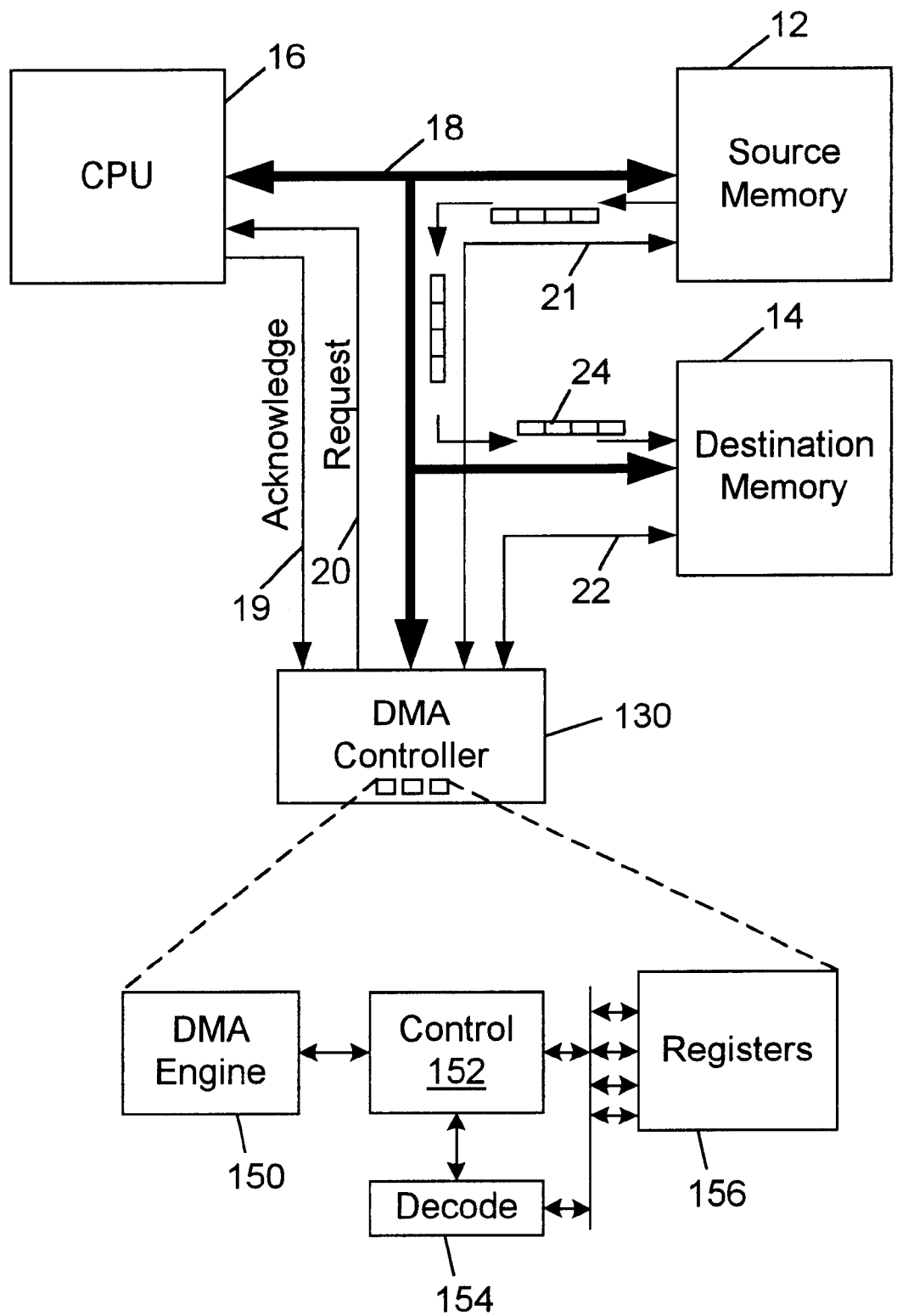
FIG. 2 is a block diagram of a DMA controller as illustrated in FIG. 1, further illustrating certain components of the DMA controller of the present invention.

Reference is now made to FIG. 2, which is a block diagram illustrating a system having a DMA controller 130 that is improved by decode circuitry 154 that is capable of executing a new command, in accordance with the present invention. As will be appreciated by persons skilled in the art, in addition to the newly-added command, which will be described below, the DMA controller 130 has a certain fundamental architecture and operational circuitry. Illustrating this circuitry within the first DMA controller 130, the functional circuitry inherent in each of the DMA controllers may be illustrated as comprising a DMA engine 150, DMA control 152, decode circuitry 154, and a plurality of registers 156. In one embodiment, the DMA engine 150 may be implemented as a state machine, which interfaces with all external signaling. In this regard, the DMA engine 150 interfaces with external circuitry to receive, for example, Acknowledgment signaling and generate, for example, Request signaling. It also both receives and generates the requisite address and data signals for the bus 118. The control portion of the circuitry 152 may also be implemented in a state machine, which interfaces among the DMA engine 150, decode circuitry 154, and internal DMA registers 156.

In a preferred embodiment, the registers 156 may include, among others, a configuration register, a command register, a start address register, a data length register, etc. When a processor, or other external circuit device initiates the DMA process, as described above, it instructs the DMA controller as to the length of the block of data to be transferred, as well as the starting address for the transfer. These values may be written into the internal registers 156 of the relevant DMA controller. The decode circuitry 154 may simply be provided for decoding instructions and supplying the relevant information to the control state machine 152.

Figure 3:
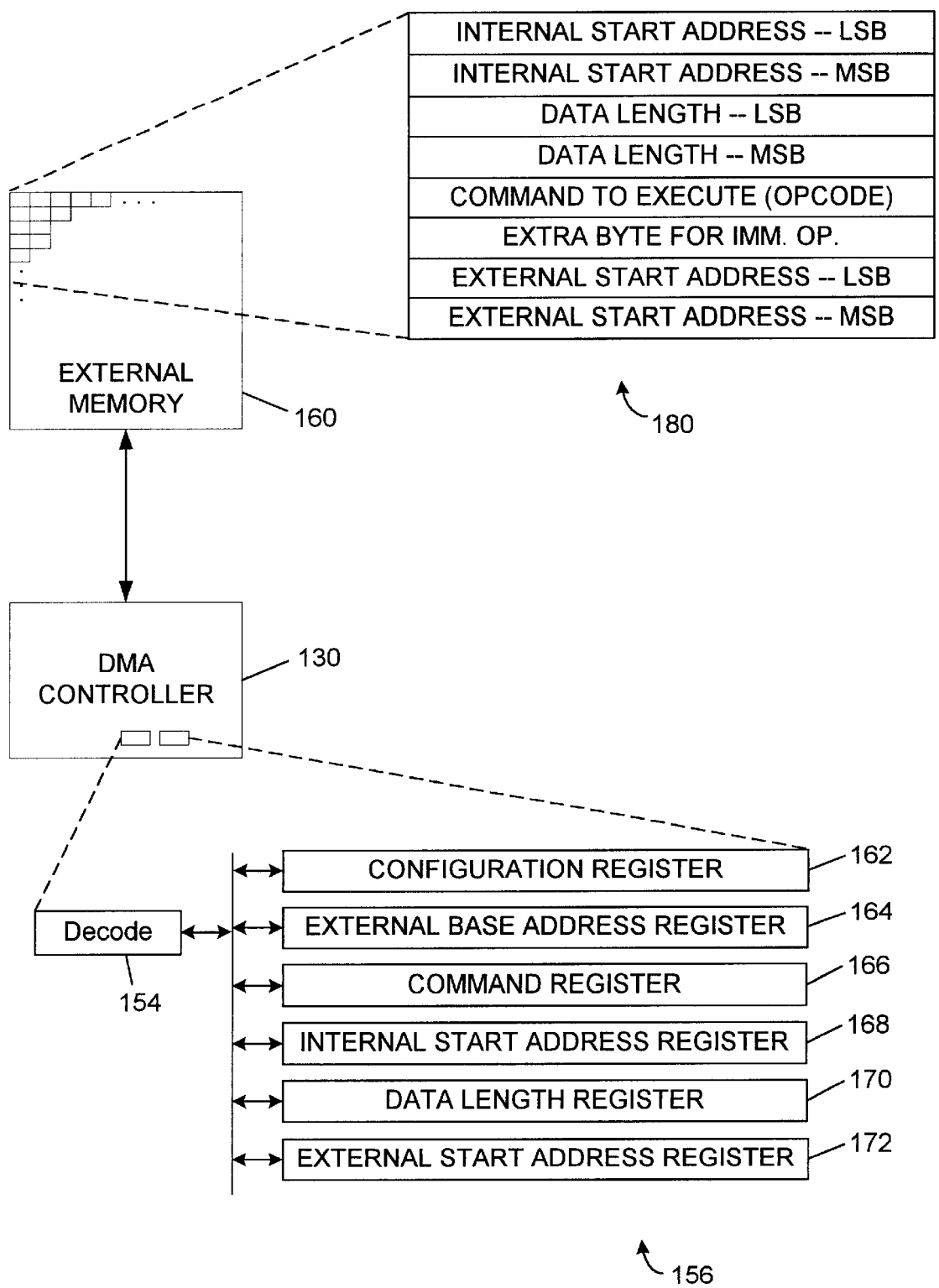
FIG. 3 is a block diagram of a DMA controller having circuitry for executing instructions stored in a compact fashion in an external memory.

To more particularly describe and illustrate features of the present invention, reference is made to FIG. 3, which is a block diagram that shows a DMA controller disposed in connection with an external memory 160. The DMA controller 130 is constructed in accordance with the teachings of the present invention, and includes decode circuitry 154. The decode circuitry 154 operates in concert with the DMA engine 150 (FIG. 2) to carry out the operations of the DMA controller. In this regard, one such function of the decode circuitry 154 is to self-decode various executable commands that may be carried out by the DMA controller 130.

In accordance with the preferred embodiment of the invention, the decode circuitry 154 is constructed to operate in connection with a plurality of internal DMA registers 156. These registers may include a configuration register 162, an external base address register 164, a command register 166, an internal start address register 168, a data length register 170, and an external start address register 172. The configuration register may contain a value that provides information for the decode circuitry 154 to utilize in connection with the configuration of the DMA controller 130. The external base address register 164, as the name implies, includes the base address for external memory reads and/or writes. The contents of the base address register 164 are combined with the contents of an external start address register 172 (below) to completely specify an external address (i.e., an address off-chip). In the preferred embodiment, the absolute external address is specified by the sum of base address register 162 (shifted by eight bits) and the external start address register 172, specifying a 24 bit address.

The command register 166 includes an OpCode, as well as an operand ("extra byte"), for carrying out a specific instruction within the instruction set of the DMA controller 130. The internal start address register 168 contains an address internal to the DMA controller 130 that may be used in conjunction with the execution of an instruction from the DMA controller 130 instruction set. The data length register 170 may include a count that defines the number of bytes that are to be moved in connection with a DMA move operation. Finally, the external start address register 172 contains an "offset" that, together with the value of the base address register, identifies an address of a starting address for a DMA move. Accordingly, collectively the base address register 164, the external start address register 172 and data length register 170 define the start address and size of a portion of memory that is to be moved in the context of a DMA operation.

Of course, other registers may be provided in addition to those illustrated in FIG. 3 and discussed above. Further, the registers discussed above may have other functions and be utilized for other purposes, consistent with the concepts and teachings described herein.

The decode circuitry 154 of the present invention is configured to decode instructions that may be stored external to the DMA controller 130 in an extremely compact and therefore efficient manner. For example, an external memory 160, such as a ROM or RAM, may be used to store a plurality of instructions that are to be executed by the DMA controller 130. In accordance with the preferred embodiment, a DMA instruction for decoding by the decode circuitry 154 and execution by the DMA engine 150 (FIG. 2) comprises a very compact eight-byte memory segment 180. The memory segment 180 preferably comprises the following eight bytes: the eight least significant bits for the internal start address register 168, the eight most significant bits for the internal start address register 168, the eight least significant bits of the data length register 170, and eight most significant bits of the data length register 170, the OpCode of the command to execute (the least significant bits of the command register 166), an extra byte such as an operand for the OpCode (the most significant bits for the command register 166), the eight least significant bits for the external start address register 172 and the eight most significant bits for the external start address register 172. In the preferred embodiment, these data elements are arranged in external memory 160 in the order listed above, and as further shown in Table 1 below.

TABLE 1

| Memory Address (Offset) | Register Contents |
|---|---|
| 00 | Internal Start Address - LSB |
| 01 | Internal Start Address - MSB |
| 02 | Block Length - LSB |
| 03 | Block Length - MSB |
| 04 | Command to Execute (OpCode) |
| 05 | Extra Command Byte |
| 06 | External Start Address - LSB |
| 07 | External Start Address - MSB |

It will be appreciated, however, that the eight bytes illustrated in Table 1 may be contained in any order within the same eight-byte memory block. What is significant is that the command structure for the instruction set of the DMA controller 130 is that in an extremely compact eight byte segment. Accordingly, only eight bytes of information need be communicated from the external memory 160 to the DMA control 130 in order for the instruction to be loaded within the instruction register 156 and further decoded for execution by the decode circuitry 154. In this respect, the decode circuitry 154 is broadly labeled as such, but actually performs multiple functions. One function is the retrieval of data from external memory 160 and the placement of that data in the appropriate registers 156. The decode circuitry 154 further takes the information from the internal registers 156, decodes that information, and supplies it to the control 152 and DMA engine 150 state machines for execution.

Figure 4:
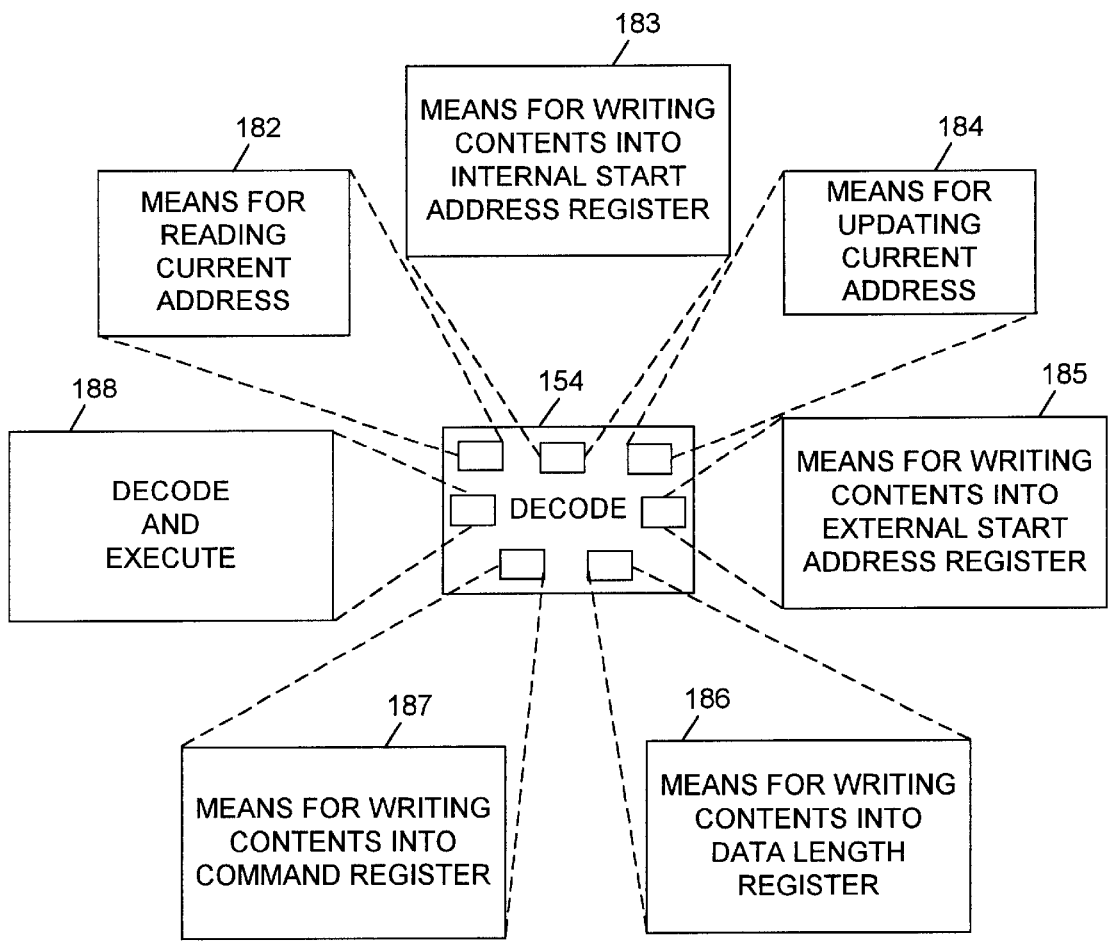
FIG. 4 is a block diagram illustrating certain functional segments forming the decode circuitry of the DMA controller.

Some of these various tasks of the decode circuitry 154 are illustrated in FIG. 4. It will be appreciated that the various blocks illustrated in FIG. 4 are characterized as "means" elements, and may be implemented by the system in dedicated hardware, or in a more general purpose hardware structure having microcode to control the hardware to carry out the various functions or tasks. In this regard, some of the elements include a means for reading a current address 182 from external memory 160. A means for writing contents read from external memory into the internal start address register 183, a means for updating the current address 184 (i.e., updating a pointer or other mechanism to point to the next address location to retrieve from memory 160), means for writing contents obtained from memory into the external start address register 185, means for writing information retrieved from external memory into data length register 186, means for writing information obtained from the external memory into the command register 187, as well as means for decoding and executing instructions (in conjunction with the control circuit 152 and DMA engine 150). As previously mentioned, the present invention is directed to the compact organization of the instruction set information within an external memory and the decode circuitry that is associated with retrieving that information and loading it into registers. While the decode circuitry 154 may provide additional functionality in the context of its decoding and execution operations, these operations need not be further described herein, as they do not form part of the presently claimed invention.

Figure 5:
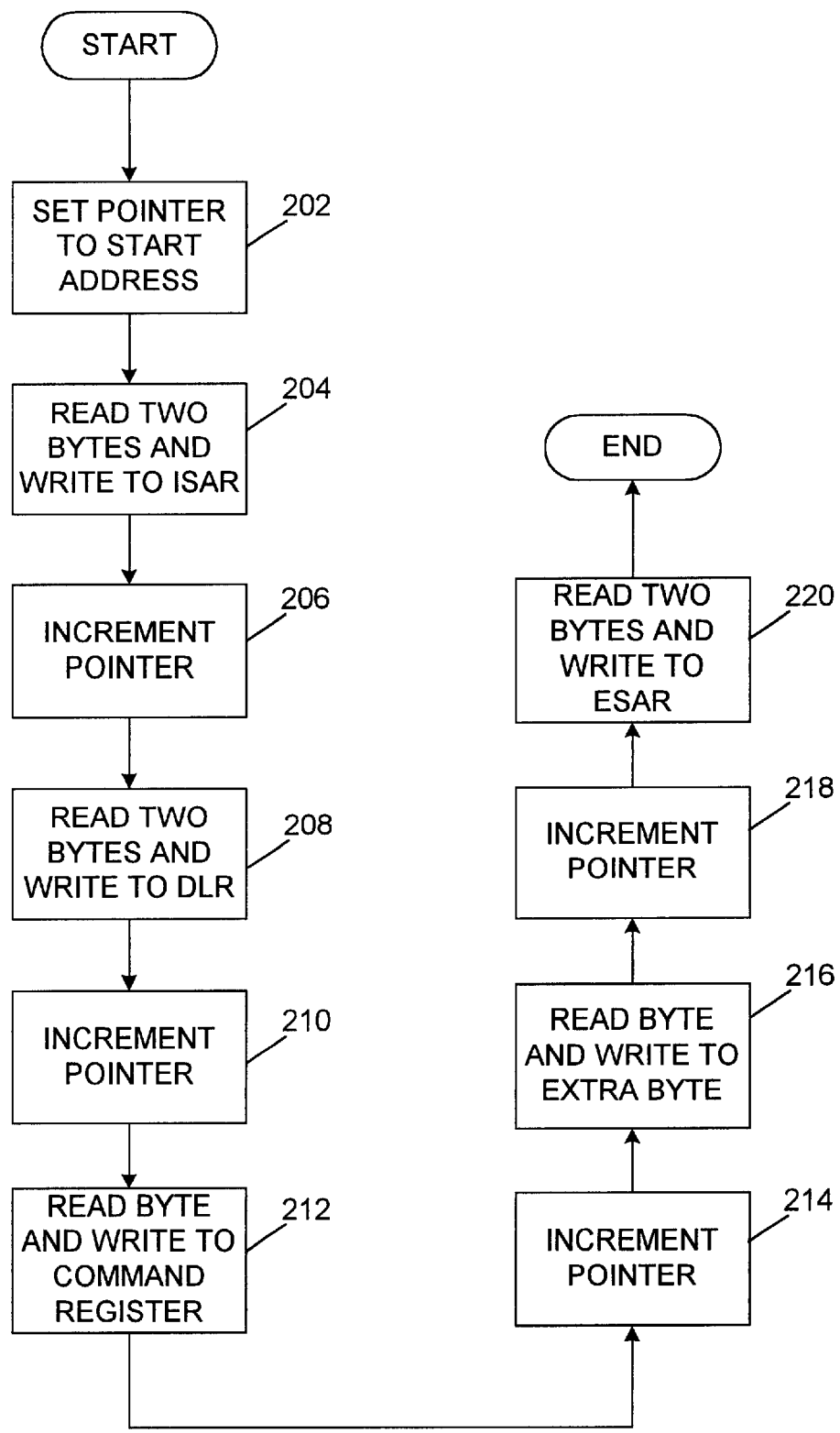
FIG. 5 is a flow chart illustrating the top-level functional operation of a DMA controller configuring internal registers in accordance with the preferred embodiment.

Reference is now made to FIG. 5, which is a flow chart that illustrates the top level operation of one aspect of the decode circuitry 154. In this regard, in connection with the execution of a given instruction, the decode circuitry 154 may set a pointer to starting address of external memory (step 202). This starting address may be specified by the external base address register 164 or in some other fashion. The decode circuitry then reads in two consecutive bytes from memory and writes them to the internal start address register (step 204). The system may then increment the pointer (e.g., contents of the base address register) to point to the next external memory address (step 206). Again, the system reads the following two bytes of data and writes them to the data length register (step 208). The system again increments a pointer (step 210), to point to the next memory address. There, the system reads a data byte and writes the value into the least significant bits (OpCode) of the command register (step 212). Again, the pointer is incremented (step 214) and the next byte of data is read from memory and written into the most significant bits of the command register (step 216). One last time, the pointer is again incremented (step 218) and the next two bytes are read from memory and written into the external start address register 220. Again, it will be appreciated that the flow chart of FIG. 5 may be implemented in various ways, and the particular steps delineated in FIG. 5 may be provided in various order, depending upon the lay out of the memory contents, as denoted in Table 1.

Figure 6:
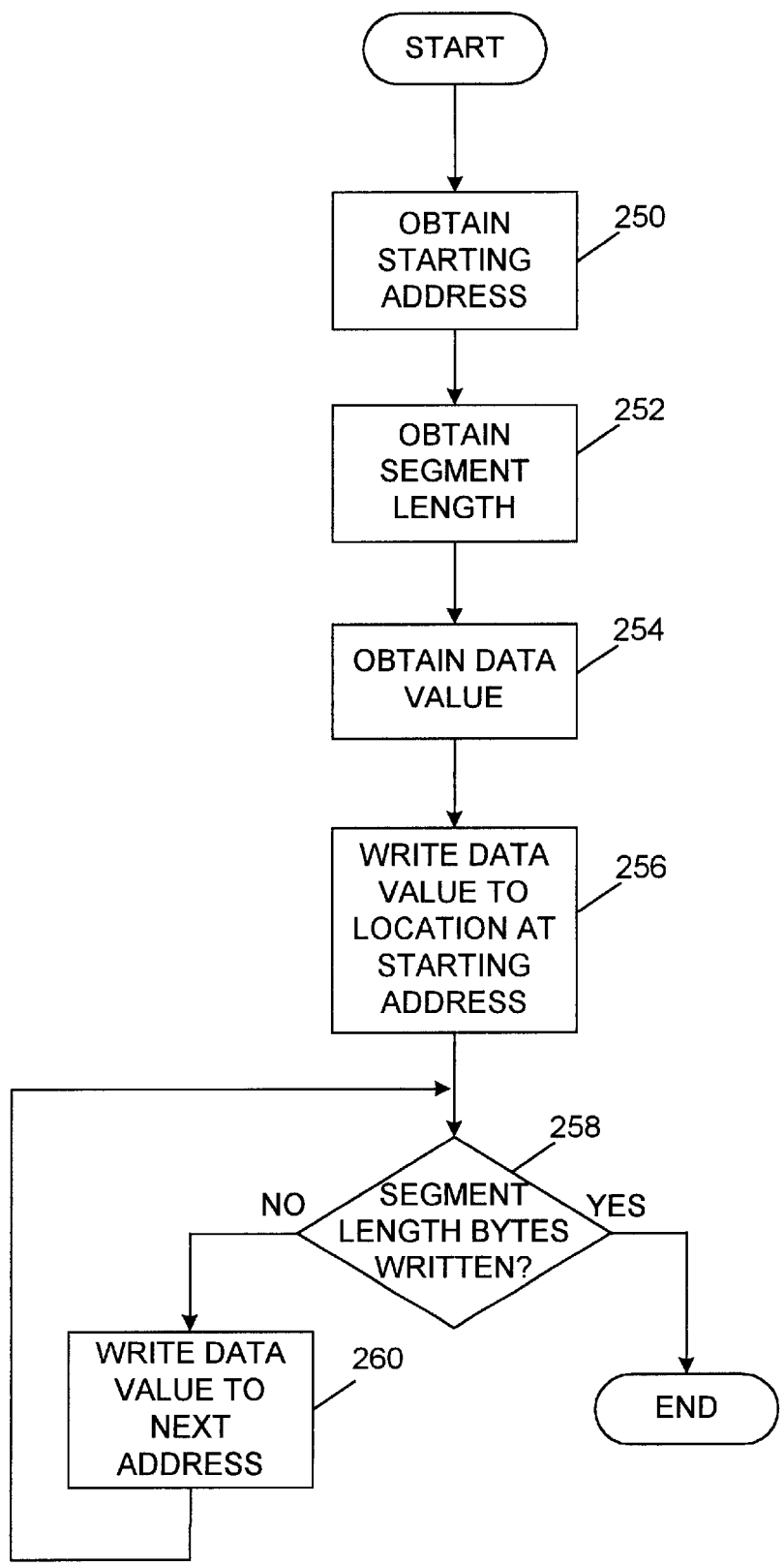
FIG. 6 is a flow chart illustrating the top-level functional operation of a DMA controller performing a memory fill command in accordance with one aspect of the invention.
Figure 7:
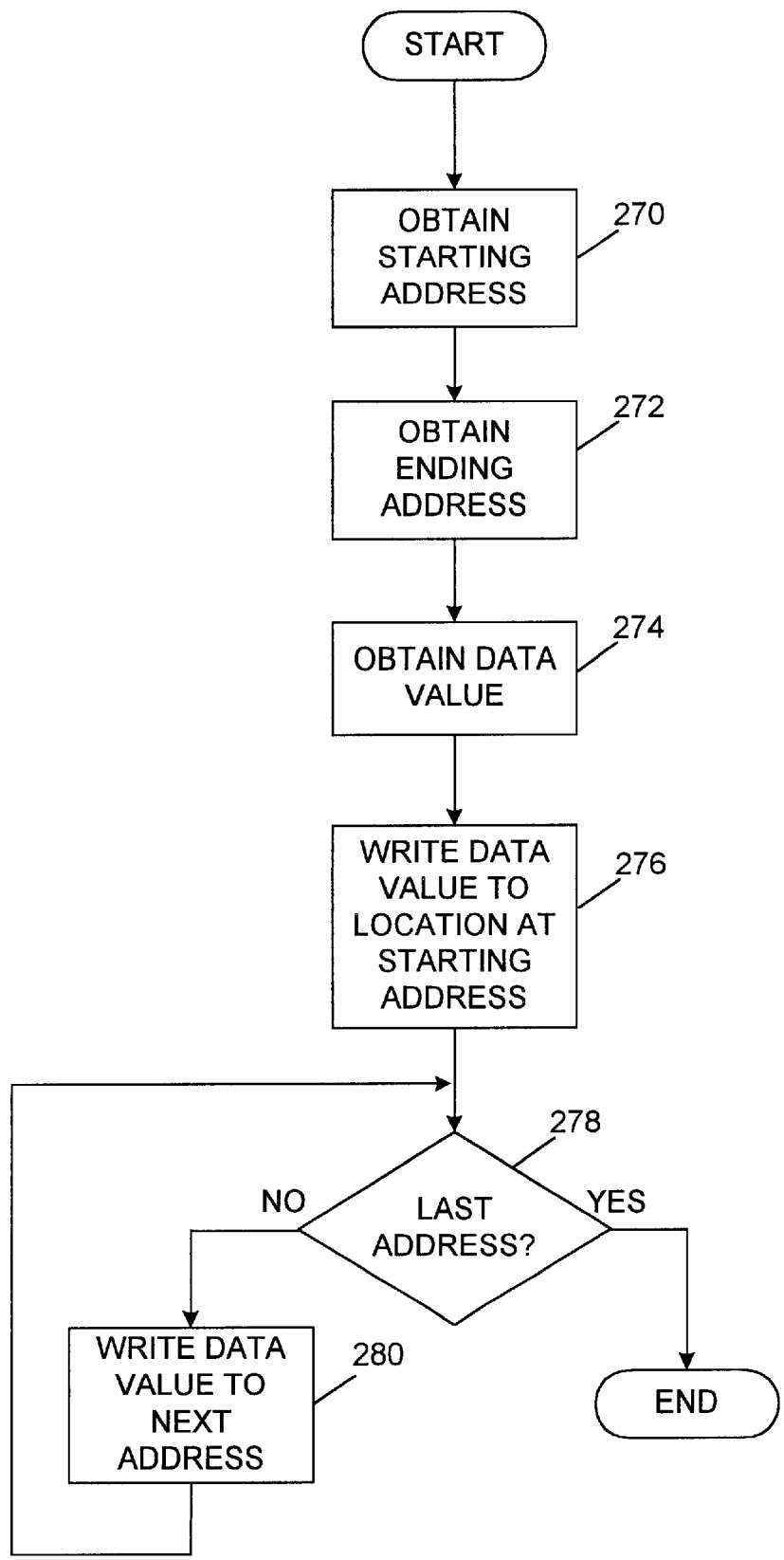
FIG. 7 is a flow chart illustrating the top-level functional operation of a DMA controller performing a memory fill command in accordance with another aspect of the invention.
Figure 8:
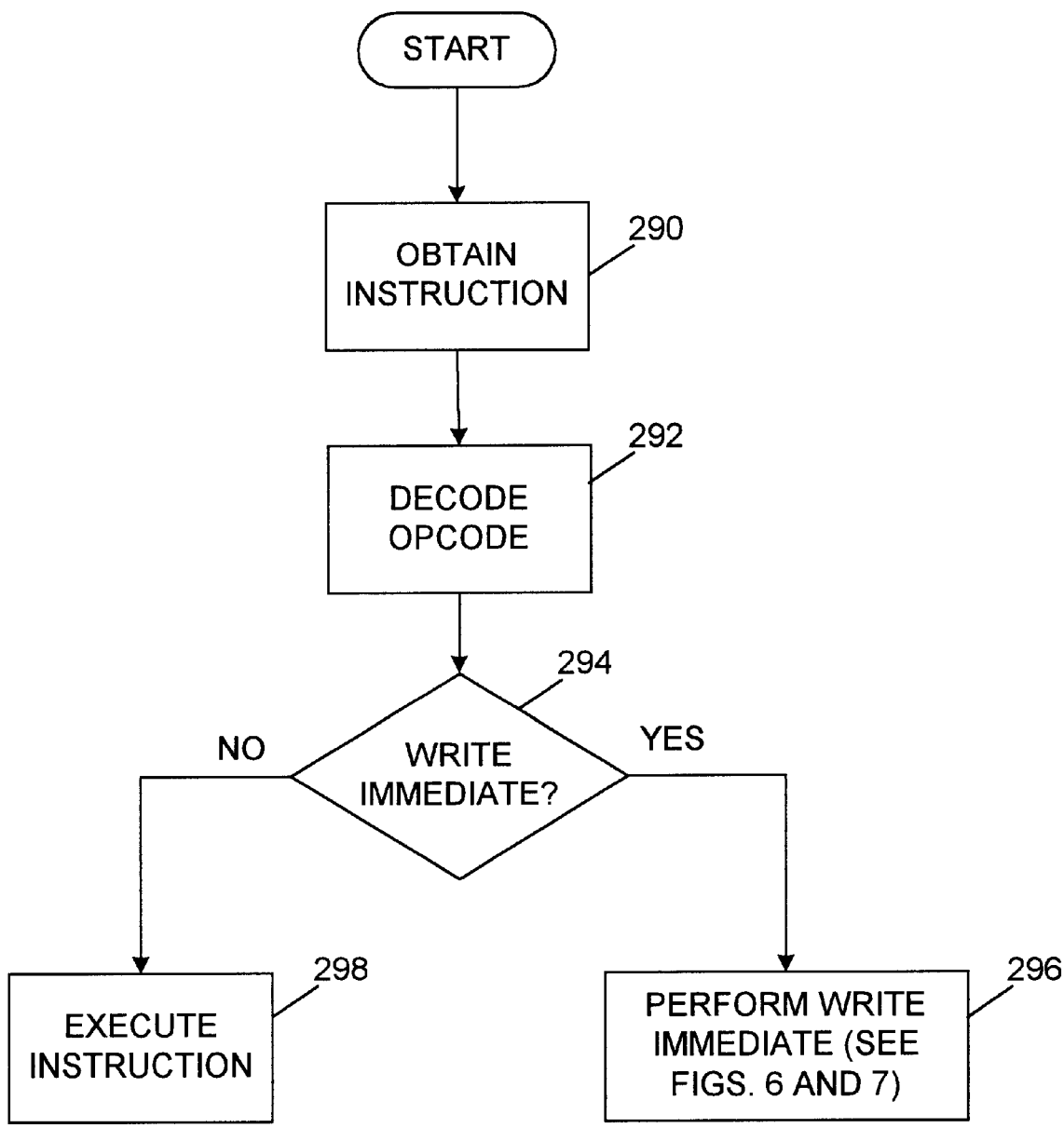
FIG. 8 is a flow chart illustrating the top-level functional operation of a DMA controller executing a memory fill command.
Figure 9:
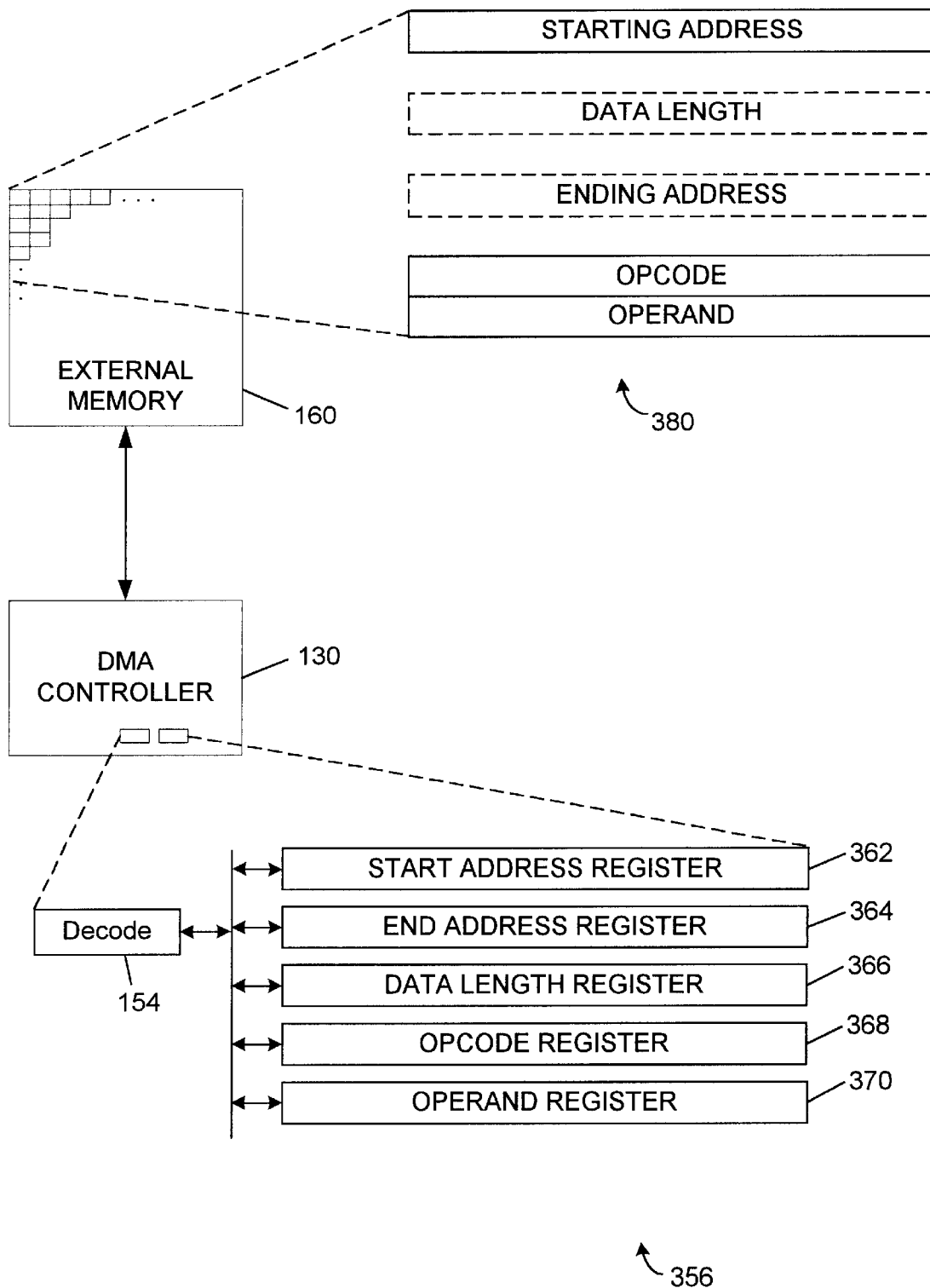
FIG. 9 is a block diagram of a DMA controller similar to that of FIG. 3, but illustrating certain generic memory elements and internal registers that may be utilized by a DMA controller designed to execute a memory fill command in accordance with the present invention.

Having described the environment of the preferred embodiment of the present invention, FIGS. 6–8 are flow charts that illustrate various aspects of the present invention. Before turning to these figures, however, reference is made first, briefly, to FIG. 9, which is a block diagram similar to FIG. 3, but illustrating the registers and memory contents in a more generic fashion. As previously discussed, the present invention is directed to a method for a DMA controller to fill a segment of memory with a repeating value. Although there are various ways of implementing the broad concepts of the present invention, FIG. 9 illustrates certain basic components of one such system. In this regard, certain minimum information 380 must be supplied to the DMA controller. This information includes a starting address, a data (or segment) length, a command (Opcode), and the data to be written to memory (Operand). An ending address is also shown. However, both the ending address and the data length are illustrated in dashed line, because it will be appreciated that only one of these values is needed. That is, with either the starting address and the data length (i.e., the number of bytes to be written to memory), or the starting address and the ending address, the actions of the present invention may be implemented with equal effectiveness.

Furthermore, consistent with the scope and spirit of the present invention, additional information 380 and additional internal registers 356 may be provided in order to effectuate the operation of other commands or functions of the DMA controller 130. Those illustrated in FIG. 9 are depicted merely for purposes of implementing the broad concepts of the memory fill command of the present invention.

An Opcode (command) and an Operand (data to be written to memory) are also provided. In a relatively simple implementation, these values may be eight bit values. In an alternative implementation, they may be larger values. Indeed, the Operand my be 16 bits, 24 bits, 32 bits, 64 bits, or even some other length, depending upon the flexibility desired in the data value that is repeatedly written to memory. Likewise, the Opcode may be a larger size as well. It will be appreciated, however, that an eight bit Opcode can be decoded by the decode circuitry 154 to provide two hundred fifty six different instructions for the DMA controller 130. In addition, it should be further appreciated that the start address may be a higher value than the ending address. That is, the memory fill command of the present invention may begin at a starting address and write upward in memory locations, or may write downward in memory locations.

In the preferred embodiment, there will be a dedicated internal storage area into which the data 380 may be received. In the preferred embodiment, this storage area may be in the form of dedicated registers. Therefore, the system may include a dedicated start address register 362, a dedicated end address register 364, a dedicated data length register 366, a dedicated Opcode (command) register 368, and a dedicated Operand (data value) register 370. The decode circuitry 154 may be configured to decode the contents of the Opcode register 368 to identify a memory fill command. Other, processing circuitry (not shown) may be configured to control the DMA controller to carryout the operation of repeatedly writing the Operand value to consecutive memory locations.

Having depicted one architecture that may be used to implement a system constructed in accordance with the present invention, reference is now made to FIG. 6, which is a flow-chart that illustrates the top-level functional operation of one embodiment of the present invention. In accordance with this embodiment, the method obtains a starting address (step 250). It then obtains a segment length identifier (step 252), and obtains a data value (step 256). In accordance with the preferred embodiment, this information is obtained by reading successive bytes from external memory, as described above. The starting address may then be written into a start address register 362. In one embodiment, this step may include retrieving both a base address and an offset, which together specify a starting address (for writes to external memory). Alternatively, the starting address may be completely specified in a single register for writes to internal memory space, or if the external starting address register is large enough to specify the complete address.

A segment length identifier may be written into a dedicated data length register 366, and the data value may be written into a dedicated Operand register 370. Alternatively, the Opcode and Operand may be collectively written into a single command register, such as register 166 of FIG. 3. The data value is the value that is written repeatedly to consecutive memory locations. The method then writes the data value to a plurality of consecutive locations in the memory, beginning at the starting address, wherein the number of consecutive locations written to is equal to the segment length identifier (step 258).

Reference is now made to FIG. 7, which illustrates another embodiment of the present invention, similar to that of FIG. 6. In accordance with this embodiment, the method obtains a starting address (step 270). It then obtains an ending address (step 272), and obtains a data value (step 276). In accordance with one preferred embodiment, this information is obtained by reading successive bytes from external memory, as described above. The starting address may then be written into a starting address register 362.

The ending address may be written into a dedicated register 364 and the data value may be written into a dedicated register 368. The data value is the value that is written repeatedly to consecutive memory locations. The method then writes the data value to a plurality of consecutive locations in the memory, beginning at the starting address, wherein the number of consecutive locations written to is equal to the segment length identifier (step 278).

Reference is now made briefly to FIG. 8, which is a flow chart that illustrates the top level operation of a system that is operating in accordance with the invention. In a first step, the DMA controller receives in instruction from memory (step 290). This instruction may be received in the manner described above. It may then decode the Opcode (command to execute) of the instruction (step 292). It may then determine whether this instruction is a write immediate, or memory fill, instruction in accordance with the invention (step 294). If so, then the system may execute the instruction in accordance with a method such as that illustrated in FIG. 6, FIG. 7, or other similar method (step 296). If not, the system may simply execute the instruction in accordance with a method that is known in the prior art (step 298).

The flow chart of FIGS. 5–8 show the architecture, functionality, and operation of a possible implementation of the DMA controller. In this regard, each block represents a module, segment, or portion of code, which comprises one or more executable instructions for implementing the specified logical function(s). It should also be noted that in some alternative implementations, the functions noted in the blocks may occur out of the order noted in FIGS. 5–8. For example, two blocks shown in succession in FIGS. 5–8 may in fact be executed substantially concurrently or the blocks may sometimes be executed in the reverse order, depending upon the functionality involved, as will be further clarified hereinbelow.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for a DMA controller to fill a segment of memory with a repeating value comprising the steps of:
   (a) receiving a starting address and setting a "current address" to the starting address;
   (b) receiving a data length;
   (c) receiving a data value;
   (d) writing the data value to a location specified by the address pointer;
   (e) incrementing the current address; and
   (f) repeating steps (d) and (e) until the data value has been written a plurality of times, equal to the data length value.

2. The method of claim 1, wherein the data length value is received and stored in an internal data length register.

3. The method of claim 1, wherein the data value is received and stored in a dedicated internal register.

4. The method of claim 3, wherein the dedicated internal register is an extra byte register.

5. The method of claim 3, wherein the dedicated internal register is an external start address register.

6. A method for a DMA controller to fill a segment of memory with a repeating value comprising the steps of:
   (a) obtaining a starting address;
   (b) obtaining a segment length identifier;
   (c) obtaining a data value; and
   (d) writing the data value to a plurality of consecutive locations in the memory, beginning at the starting address, wherein the number of consecutive locations written to is equal to the segment length identifier.

7. The method of claim 6, wherein the step of obtaining the starting address comprises retrieving the starting address from a memory location and internally storing it in an external starting address register.

8. The method of claim 6, wherein the step of obtaining the starting address comprises retrieving the starting address from a memory location and storing it internally in a combination of registers, including an external base address register and an external starting address register.

9. The method of claim 6, wherein the step of obtaining the segment length identifier comprises retrieving the segment length identifier from a memory location and storing it internally in a,data length register.

10. The method of claim 6, wherein the segment length identifier comprises an ending address, wherein the data value is written to each and every memory location beginning at the starting address and ending after a plurality of data bytes have been written, wherein the plurality of data bytes is equal to the value stored in the data length register.

11. The method of claim 6, wherein the step of obtaining the data value comprises retrieving the data value from a memory location and storing it internally in an extra byte register.

12. The method of claim 6, wherein the step of obtaining the data value comprises retrieving the data value from a memory location and storing it internally in an external start address register.

13. A method for a DMA controller to fill a segment of memory with a repeating value comprising the steps of:
   (a) obtaining a starting address;
   (b) obtaining an ending address;
   (c) obtaining a data value; and
   (d) writing the data value to a plurality of consecutive locations in the memory, beginning at the starting address and ending at the ending address.

14. A direct memory access (DMA) controller for filling a segment of memory with a repeating value comprising:
   (a) logic configured to obtain a starting address;
   (b) logic configured to obtain a segment length identifier;
   (c) logic configured to obtain a data value; and
   (d) logic configured to write the data value to a plurality of consecutive locations in the memory, beginning at the starting address, wherein the number of consecutive locations written to is equal to the segment length identifier.

15. A direct memory access (DMA) controller for filling a segment of memory with a repeating value comprising:
   (a) logic configured to obtain a starting address;
   (b) logic configured to obtain an ending address;
   (c) logic configured to obtain a data value; and
   (d) logic configured to write the data value to a plurality of consecutive locations in the memory, beginning at the starting address and ending at the ending address.

* * * * *